(12) United States Patent
Flatt

(10) Patent No.: US 7,795,433 B2
(45) Date of Patent: Sep. 14, 2010

(54) METHODS FOR PREPARING PERYLENE/PERINONE PIGMENTS

(75) Inventor: Thomas Flatt, Dorchester, SC (US)

(73) Assignee: Sun Chemical Corporation, Parsippany, NJ (US)

( * ) Notice: Subject to any disclaimer, the term of this patent is extended or adjusted under 35 U.S.C. 154(b) by 949 days.

(21) Appl. No.: 11/608,574

(22) Filed: Dec. 8, 2006

(65) Prior Publication Data

US 2008/0139813 A1     Jun. 12, 2008

(51) Int. Cl.
*C07D 221/18*     (2006.01)
*C07D 471/08*     (2006.01)

(52) U.S. Cl. .............................. 546/38; 546/37; 546/26

(58) Field of Classification Search ................... 546/38, 546/37, 26
See application file for complete search history.

(56) References Cited

U.S. PATENT DOCUMENTS

| | | | |
|---|---|---|---|
| 4,587,189 A | 5/1986 | Hor et al. | |
| 5,225,307 A | 7/1993 | Hor et al. | |
| 5,808,073 A * | 9/1998 | Bohm et al. | ................... 546/39 |

FOREIGN PATENT DOCUMENTS

| | | |
|---|---|---|
| GB | 859288 | 1/1961 |
| WO | WO-2005/078023 A2 | 8/2005 |

* cited by examiner

*Primary Examiner*—Charanjit S Aulakh
(74) *Attorney, Agent, or Firm*—Dickstein Shapiro LLP

(57) ABSTRACT

A method for preparing a perylene pigment or perinone pigment involves a condensation reaction between perylene tetracarboxylic acid or naphthalene tetracarboxylic acid, or anhydrides or imides thereof, and amines in the presence of certain metal catalysts, such as ammonium molybdate, molybdenum oxide, and metal carbonyls, such as hexacarbonylmolybdenum, titanium carbonyl, iron carbonyls, and the like. The use of these catalysts provides various advantages, including the reduction of the amount of the catalyst, while achieves high yields, the lowering of reaction temperatures, and the reduction of insoluble sludge in the reaction mixture, thereby making the reaction operation easier and reducing the amounts of hazardous wastes containing heavy metals.

27 Claims, No Drawings

METHODS FOR PREPARING PERYLENE/PERINONE PIGMENTS

FIELD OF THE INVENTION

The present invention relates to a preparation of perylene or perinone pigments using certain metallic catalysts.

BACKGROUND OF THE INVENTION

Current technologies involving the condensation of amines with perylene-3,4,9,10-tetracarboxylic-3,4,9,10-dianhydride (PTCDA) require high-boiling point solvents, such as nitrobenzene, trichlorobenzene, N-methylpyrrolidone, benzyl alcohol, lauryl alcohol, quinoline, and the like (e.g., GB 859,288; and WO 2005/078023), and high temperatures, as high as 150°-250° C. (e.g., U.S. Pat. No. 5,225,307; WO 2005/078023; and GB 859,288), to form the condensation products. To lower the reaction temperature, the reaction may be conducted under pressure using a lower boiling point solvent, such as water, chlorobenzenes, and the like. Also, certain catalysts can be used to lower the reaction temperature.

Commonly used catalysts for the condensation reactions include zinc salts, such as anhydrous zinc chloride, anhydrous zinc acetate, zinc oxide, and the like, and acids, such as sulfuric acid, phosphoric acid, hydrochloric acid, acetic acid, p-toluene sulfonic acid, and the like (see, for example, U.S. Pat. No. 4,587,189; and GB 859,288). When zinc salts are used for the condensation reactions, it is necessary to use a large amount of the zinc salts in order to drive the reaction at a reasonable rate and to attain high yields, for example, above 90%. This typically results in the formation of high amount of insoluble sludge in the reaction mixture. To avoid this, the zinc salts need to be highly diluted with a solvent. The lower the dilutions of zinc salt, the more the formation of insoluble sludge, and the harder the agitation and, therefore, the heat transfer during the process. The high amount of insoluble sludge moreover renders the removal thereof from the reaction vessel difficult.

Other solvents such as aluminum chloride and p-toluene sulfonic acid (e.g., WO 2005/078023) have been used to solve the problem, but yields are low and not satisfactory. In addition, the requirement for high levels of zinc salts also leads to the production of the high amount of hazardous wastes containing heavy metal zinc. Thus, the need exists for an alternative catalyst to resolve these problems encountered in condensation reactions.

SUMMARY OF THE INVENTION

The present invention provides a method for preparing a condensation product using certain metallic catalysts. In particular, the present invention provides a method for preparing perylene and perinone pigments by condensation reactions between amines and perylene or naphthalene tetracarboxylic acid or their anhydrides or imides in the presence of certain metallic catalysts, such as ammonium molybdate, molybdenum oxide, and carbonyl compounds of molybdenum, titanium or iron (collectively "metal carbonyls"). The use of these catalysts is advantageous as it requires a small amount of the catalyst compared to typical catalysts conventionally used for the production of perylene or perinone pigments, and yet attain high yields comparable to the conventional catalysts. Furthermore, the condensation reactions using these catalysts produce less amount of insoluble sludge, thereby making the production process much easier and the disposal of the waste water easier and more economical.

In one embodiment, the starting materials for the condensation reaction are an amine and a compound selected from the group consisting of a perylene-3,4,9,10-tetracarboxylic acid, its anhydrides and imides (collectively "PTCDA"), optionally substituted, to obtain perylenes. In another embodiment, the starting materials for the condensation reaction are an amine and a compound selected from the group consisting of a 1,4,5,8-naphthalene-tetracarboxylic acid, its anhydrides and imides (collectively "NTCDA"), optionally substituted, to obtain perinones. In both embodiments, the reactant may be a monoanhydride, dianhydride, or monoimide monoanhydride. The imide optional substituents include alkyl and aromatic groups. The amine to be used in the present method can be primary aliphatic or aromatic monoamines or diamines.

Thus, the present invention provides a method for preparing a condensation product comprising reacting a PTCDA or NTCDA and an amine in the presence of a catalyst selected from the group consisting of ammonium molybdate, molybdenum oxide and the aforementioned metal carbonyls, and a solvent. In a specific embodiment, the condensation product is a perylene pigment. In another specific embodiment, the condensation product is a perinone pigment.

DETAILED DESCRIPTION OF THE INVENTION

The present invention generally relates to a method for preparing a condensation product between PCTDA or NTCDA and an amine using certain metallic catalysts. The present invention is based, partly, on the discovery that the use of certain catalysts for a condensation reaction between o-phenylene diamine and PTCDA results in more efficient and economical production of the condensation products, i.e., o-phenylenediamine pigments.

Previously, problems were encountered when an attempt was made, for economical purposes, to reduce the amount of the solvent (e.g., N-methylpyrrolidone) in the condensation reaction using zinc salts as catalysts. The reduction of the amount of the solvent to 6-7 parts based on the amount of PTCDA resulted in the formation of a large amount of insoluble sludge, which hindered the agitation and the removal of the reaction mass from the vessel during the process.

A surprising result was obtained by replacing zinc salts with, for instance, ammonium molybdate, because the condensation reaction required much less amount of ammonium molybdate than that of zinc salts and yet achieved the same yield as the latter with more ease and efficiency. Although the ammonium molybdate is more expensive than zinc salts, the overall cost for the condensation reaction using the former is about the same as using the latter. Furthermore, the use of ammonium molybdate also results in the reduction of the wastes containing hazardous metals and is beneficial for the environment.

Thus, the present invention provides a method for preparing a condensation product comprising reacting PTCDA or NTCDA with an amine in the presence of a specific metallic catalyst and an appropriate solvent. The condensation product is a perylene pigment or a perinone pigment depending on the starting materials.

The condensation reaction can be carried out under typical conditions well known in the art, except for using a specific metallic catalyst in the place of conventional catalysts and the type and amount of solvent.

The starting materials for preparing perylene pigments include a perylene-3,4,9,10-tetracarboxylic acid or its monoanhydride (i.e., perylene-3,4-dicarobxylic acid monoanhydride) or dianhydride (collectively "PTCDA"), or a perylene monoimide monoanhydride, whose monoimide portion being optionally substituted with a hydrogen, or an alkyl or aromatic group, and derivatives thereof, including, but are not limited to, halogen derivatives, such as dichloroperylene-3,4,9,10-tetracarboxylic anhydride; tetrachloroperylene-3,4,9,10-tetracarboxylic anhydride; and bromoperylene-3,4,9,10-tetracarboxylic anhydride, and the like, and corresponding sulfonated or nitrated PTCDA or perylene monoimide monoanhydride, and the like.

The starting materials for preparing perinone pigments include a 1,4,5,8-naphthalene-tetracarboxylic acid or its mono- (i.e., 1,8-naphthalene-dicarboxylic acid monoanhydride) or dianhydride (collectively "NTCDA"), or a naphthalene monoimide monoanhydride, whose monoimide portion being optionally substituted with a hydrogen, or an alkyl or aromatic group, and derivatives thereof, including, but are not limited to, halogenated, sulfonated, or nitrated NTCDA or naphthalene monoimide monoanhydride.

Suitable amines to be used in the condensation reaction to obtain perylene or perinone pigments include, but not by way of limitation, primary aliphatic monoamines, including alkylamine and alcoholamine, such as methylamine, ethanolamine, and the like; primary aliphatic diamines, such as 1,4-diaminobutane, ethylenediamine, trimethylenediamine, hexamethylenediamine, nonamethylenediamine, decamethylenediamine, and the like; primary aromatic monoamines, such as 2-methylaminopyridine, 3-methylaminopyridine, 5-methylpyridin-3-ylamine, 2-amino-4-methyl-pyridine, 2-amino-3-methyl-pyridine, 2-amino-6-methyl-pyridine, aniline, dimethylanilines, p-toluidine and the like; primary aromatic diamines, such as benzidine, o-phenylenediamine, meta-phenylenediamine, para-phenylenediamine, 1,2-diamino-4-methylbenzene, 1,2-diamino-4-methoxybenzene, 1,2-diamino-4-chlorbenzene, 2,3-diaminonaphthalene, 2,3-diamino pyridine, 3,4-diamino pyridine, 5,6-diamino pyrimidene, 9,10-diamino phenanthrene, 1,8-diamino naphthalene, 4,4'-oxydianiline, 4,4'-diaminodiphenylmethane, 2,4'-diaminodiphenylmethane, 4,4'-diaminodiphenylether, 2,4'-diaminodiphenylether, 4,4'-diaminobenzophenone, 4,4'-diaminodiphenylsulphone, 3,3'-diaminodiphenylsulphone, 4,4'-diaminodiphenylethane-1,1,4,4'-diaminodiphenylpropane-2,2,4,4'-bis(4-aminophenoxy)-diphenylsulphone, and the like.

The molar ratio of an amine and PTCDA, NTCDA, or monoimide monoanhydride thereof, is typically about 2:1 to about 10:1, preferably about 2:1 to about 3:1, and most preferably about 2.2:1 to about 2.4:1.

The catalyst to be used in the present invention can be selected from the group consisting of ammonium molybdate [$(NH_4)_2MoO_4$], molybdenum oxide ($MoO_2$), and metal carbonyls. The metal carbonyls suitable for the present invention include, but are not limited to, hexacarbonylmolybdenum [$Mo(CO)_6$], carbonyl titanium [$Ti(CO)_6$], iron carbonyls, such as [$Fe(CO)_5$] and [$Fe_2(CO)_9$], and the like. These catalysts are commercially available. The amount of the catalyst in the present method should be at least about 0.01 mole, based on 1 mole of PTCDA or NTCDA, and is only limited by cost and the amount of the resulting insoluble sludge generated in the reaction mixture. Preferably the amount of the catalyst is in the range of about 0.01 to about 1 mole, more preferably in the range of about 0.02 to about 0.5 mole, and most preferably in the range of about 0.03 to about 0.1 mole, based on 1 mole of PTCDA or NTCDA.

The solvent for the condensation reaction can be any solvent typically used for the reaction and include, but are not limited to, high-boiling point solvents, such as nitrobenzene, trichlorobenzene, N-methylpyrrolidone, cyclo-hexylpyrrolidone, benzyl alcohol, lauryl alcohol, quinoline, dimethylsulfoxide, dimethylformimide, and the like; and low-boiling point solvents, such as chlorobenzene, glacial acetic acid, water, and the like. The solvent can be reduced or replaced by use of an excess amount of the amine to be reacted with PTCDA, NTCDA, or monoimide monoanhydride thereof. In general, about 1 to about 20 parts by weight, preferably about 5 to about 15 parts by weight, and most preferably about 6 to about 10 parts by weight, of the solvent for each part of PTCDA or NTCDA have been found particularly advantageous to use.

The condensation reaction to prepare a perylene pigment can be carried out at a temperature determined by the type of solvent used but, in general, in the range of about 140° C. to about 300° C., preferably about 180° C. to about 225° C. For preparing a perinone pigment, the reaction temperature can be in the range of about 80° C. to about 300° C., preferably about 90° C. to about 220° C. The reaction time depends on the reaction temperature, but typically is several minutes at the highest temperatures to several hours at the lower temperatures.

Upon completion of the reaction, typically, the reaction mixture is cooled and filtered to remove the solvent. The resulting presscake is washed with the solvent.

The thus prepared condensation product can be used as crude pigments that have not been modified after chemical synthesis, but also can be modified by, for example, halogenation, sulfonation, or nitration. Furthermore, the pigments can be conditioned or otherwise treated by any methods well known in the art. Such conditioning or treatment may include, but not by way of limitation, various types of milling, including milling with bead mill, media mill, three roll mill, and the like. Although the particular milling apparatus is generally not critical, suitable mills include horizontal mills (for example, Eiger mills, Netzsch mills, and Super mills), vertical mills, ball mills, three roll mills, attritors, vibratory mills, and the like containing various grinding media. Suitable grinding media include salt; sand; glass beads, such as barium titanate, soda lime, or borosilicate; ceramic beads, such as zirconia, zirconium silicate, and alumina beads; metal beads, such as stainless steel, carbon steel, and tungsten carbide beads; and so forth.

Other suitable conditioning or treatment methods well known in the art may be also used to prepare a pigment prepared by the present process; such conditioning or treatment methods include acid pasting and mixing (for example, by stirring) with a conditioning solvent mixture comprising water and an aromatic carboxylic acid ester, optionally in the presence of a particle size dispersant, such as homopolymers or copolymers of ethylenically unsaturated monomers, such as (meth)acrylic acids or corresponding alkyl or hydroxyalkyl esters, polyester, polyurethane, styrene-maleic anhydride copolymers (e.g., SMA® Resins), various forms of rosin or polymerized rosin, alkali metal salts of sulfosuccinate esters, alkylene oxide polymers or copolymers, and so forth.

The conditioned or otherwise treated pigment can be collected as a presscake by methods known in the art, for example, by filtration and centrifugation, but most preferably by filtration. The presscake obtained can be dried using conventional drying methods, such as spray drying, tray drying, drum drying, and the like.

EXAMPLES

The following examples illustrate the condensation reaction according to the method provided by the present invention and those according to the conventional method. All parts and percentages are by weight and temperatures are by centigrade (° C.), unless otherwise indicated. These examples should not be construed as limiting.

Comparative Example 1

To a glass reaction flask equipped with an agitator, thermometer, Dean Stark trap and condenser, were added 13 parts N-methylpyrrolidone (NMP) based on the amount of PTCDA, 0.23 mole perylene tetracarboxylic dianhydride (PTCDA) (98% purity), 0.53 mole o-phenylene diamine, and 0.01 mole zinc sulfate monohydrate. With agitation, the reaction mass was heated to 200° C. and held 21 hours at 200-2° C. The reaction mixture was cooled and filtered from the solvent. The presscake was washed with NMP and then purified by heating to 90° in dilute sulfuric acid. After filtering and washing, the cake was reslurried in diluted caustic potash and heated to 90° C. The slurry was filtered and washed. This cake was reslurried and the pH was adjusted to neutral with dilute caustic potash. The slurry was filtered, washed, and dried at 70° C. The yield was 85.9% at 92.3% purity and an overall yield was 79.2%.

Comparative Example 2

Comparative Example 1 was repeated using 0.12 mole of zinc sulfate monohydrate. The yield was 96.7% with a purity of 94.4% and an overall yield was 91.2%.

Example 1

Comparative Example 1 was repeated except that 0.007 mole ammonium molybdate was used as the catalyst instead of the zinc salt. The yield was 96.2% at 96.6% purity and an overall yield was 92.9%.

Example 2

Comparative Example 1 was repeated using 0.037 mole perylene tetracarboxylic dianhydride, 0.271 mole p-toluidine, and 0.003 mole ammonium molybdate. The as-is yield was 19.2 grams or 89.8% yield.

The results are summarized in Table 1.

TABLE 1

| Example | PTCDA (moles) | Catalyst | Catalyst/ PTCDA Molar ratio | As is Yield % | Pure Yield % |
|---|---|---|---|---|---|
| Comparative Example 1 | 1 | ZnSO$_4$•H$_2$0 | 0.04 | 85.9 | 79.02 |
| Comparative Example 2 | 1 | ZnSO$_4$•H$_2$0 | 0.52 | 96.7 | 91.2 |
| Example 3 | 1 | (NH$_4$)$_2$MoO$_4$ | 0.03 | 96.2 | 92.9 |
| Example 4 | 1 | (NH$_4$)$_2$MoO$_4$ | 0.08 | 89.8 | — |

Example 3

Example 1 is repeated using 0.01 mole molybdenum oxide in place of the ammonium molybdate.

Example 4

Example 1 is repeated using 0.02 moles hexacarbonylmolybdenum in place of the ammonium molybdate.

Example 5

Example 2 is repeated using 0.003 moles of carbonyl titanium in place of the ammonium molybdate.

Example 6

Example 2 is repeated using 0.004 moles of carbonyl iron [Fe(CO)$_5$] in place of the ammonium molybdate.

What is claimed is:

1. A method for preparing a condensation product, comprising reacting:
   (i) a compound selected from the group consisting of a perylene-3,4,9,10-tetracarboxylic acid, a 1,4,5,8-naphthalene-tetracarboxylic acid, and anhydrides, imides and mixed anhydride imide thereof;
   (ii) an amine; and
   (iii) a solvent,
   in the presence of an oxidation/reduction catalyst wherein the catalyst is selected from the group consisting of ammonium molybdate, molybdenum oxide, molybdenum carbonyl, titanium carbonyl, and iron carbonyls.

2. The method of claim 1, wherein the amount of the catalyst is at least about 0.01 mole based on 1 mole of the compound of (i).

3. The method of claim 1, wherein the amount of the catalyst is in the range of about 0.01 to about 1 mole based on 1 mole of the compound of (i).

4. The method of claim 1, wherein the amount of the catalyst is in the range of about 0.03 to about 0.1 mole based on 1 mole of the compound of (i).

5. The method of claim 1, wherein the amount of the catalyst is in the range of about 0.02 to about 0.5 mole based on 1 mole of the compound of (i).

6. The method of claim 1, wherein the amine is selected from the group consisting of primary aliphatic monoamines, primary aliphatic diamines, primary aromatic monoamines, and primary aromatic diamines.

7. The method of claim 1, wherein the amine is selected from the group consisting of methylamine, ethanolamine, 1,4-diaminobutane, ethylenediamine, trimethylenediamine, hexamethylenediamine, nonamethylenediamine, and decamethylenediamine.

8. The method of claim 1, wherein the amine is selected from the group consisting of 2-methylaminopyridine, 3-methylaminopyridine, 5-methylpyridin-3-ylamine, 2-amino-4-methyl-pyridine, 2-amino-3-methyl-pyridine, 2-amino-6-methyl-pyridine, aniline, p-toluidine and the like; primary aromatic diamines, such as benzidine, o-phenylenediamine, meta-phenylenediamine, para-phenylenediamine, 1,2-diamino-4-methylbenzene, 1,2-diamino-4-methoxybenzene, 1,2-diamino-4-chlorbenzene, 2,3-diaminonaphthalene, 2,3-diamino pyridine, 3,4-diamino pyridine, 5,6-diamino pyrimidene, 9,10-diamino phenanthrene, 1,8-diamino naphthalene, 4,4'-oxydianiline, 4,4'-diaminodiphenylmethane, 2,4'-diaminodiphenylmethane, 4,4'-diaminodiphenylether, 2,4'-diaminodiphenylether, 4,4'-diaminobenzophenone, 4,4'-diaminodiphenylsulphone, 3,3'-diaminodiphenylsulphone, 4,4'-diaminodiphenylethane-1,1,4,4'-diaminodiphenylpropane-2,2,4,4'-bis(4-aminophenoxy)-diphenylsulphone.

9. The method of claim 1, wherein the solvent is selected from the group consisting of nitrobenzene, trichlorobenzene, N-methylpyrrolidone, cyclo-hexylpyrrolidone, benzyl alcohol, lauryl alcohol, quinoline, and chlorobenzene.

10. The method of claim 1, wherein the compound (i) is a perylene.

11. The method of claim 10, wherein the catalyst is ammonium molybdate.

12. The method of claim 11, wherein the amount of the catalyst is in the range of about 0.01 to about 1 mole based on 1 mole of the compound of (i).

13. The method of claim 10, wherein the reaction is carried out at a temperature in the range of about 140° C. to about 300° C.

14. The method of claim 10, wherein the compound (i) is perylene 3,4,9,10-tetracarboxylic acid dianhydride; and the component (ii) is phenylene diamine or toluidine.

15. The method of claim 14, wherein the solvent (iii) is N-methylpyrrolidone.

16. The method of claim 10, wherein the compound (i) is a perylene monoanhydride; and the component (ii) is phenylene diamine or toluidine.

17. The method of claim 16, wherein the compound (i) is a perylene monoimide monoanhydride.

18. The method of claim 1, wherein the compound (i) is a naphthalene.

19. The method of claim 18, wherein the catalyst is ammonium molybdate.

20. The method of claim 19, wherein the amount of the catalyst is in the range of about 0.01 to about 1 mole based on 1 mole of the compound of (i).

21. The method of claim 18, wherein the reaction is carried out at a temperature in the range of about 80° C. to about 300° C.

22. The method of claim 18, wherein the compound (i) is 1,4,5,8-naphthalene-tetracarboxylic acid dianhydride; and the component (ii) is phenylene diamine or toluidine.

23. The method of claim 22, wherein the solvent (iii) is glacial acetic acid.

24. The method of claim 18, wherein the compound (i) is a naphthalene monoanhydride; and the component (ii) is phenylene diamine or toluidine.

25. The method of claim 24, wherein the compound (i) is a naphthalene monoimide monoanhydride.

26. The method of claim 1 further comprising recovering the condensation product.

27. The method of claim 1, wherein a molar excess amount of the amine is present.

* * * * *